United States Patent
Manthos et al.

(10) Patent No.: US 7,120,914 B1
(45) Date of Patent: Oct. 10, 2006

(54) METHOD AND SYSTEM FOR NAVIGATING BETWEEN PROGRAM MODULES

(75) Inventors: Brian E. Manthos, Redmond, WA (US); Joao Pedro Silva, Redmond, WA (US); Maria Blees, Seattle, WA (US); Hemin (Herman) Xiao, Bellevue, WA (US); Jonathan P. Rosenberg, Redmond, WA (US); Sandro Menzel, Woodinville, WA (US); Jiro I. Feingold, Portland, OR (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/565,433

(22) Filed: May 5, 2000

(51) Int. Cl.
*G06F 9/46* (2006.01)

(52) U.S. Cl. ............... 718/108; 719/313; 719/329; 715/501.1; 715/778

(58) Field of Classification Search ............... 709/329, 709/108, 313; 715/501.1, 778; 345/778; 719/313, 329; 718/108
See application file for complete search history.

(56) References Cited

U.S. PATENT DOCUMENTS

| | | | |
|---|---|---|---|
| 5,530,865 A * | 6/1996 | Owens et al. ............... 709/313 |
| 6,069,628 A * | 5/2000 | Farry et al. .................. 715/835 |
| 6,081,814 A * | 6/2000 | Mangat et al. ........... 715/501.1 |
| 6,381,618 B1 * | 4/2002 | Jones et al. .................. 707/203 |
| 6,397,264 B1 * | 5/2002 | Stasnick et al. ............ 709/238 |
| 6,460,071 B1 * | 10/2002 | Hoffman ..................... 709/203 |
| 6,609,146 B1 * | 8/2003 | Slotznick .................... 709/200 |
| 2002/0007369 A1 * | 1/2002 | Saravanan ............... 707/501.1 |
| 2002/0089536 A1 * | 7/2002 | Dang ......................... 345/749 |

\* cited by examiner

*Primary Examiner*—William Thomson
*Assistant Examiner*—Li Zhen
(74) *Attorney, Agent, or Firm*—Ronald M. Anderson

(57) ABSTRACT

A navigation tool permits access between separate program modules by communicating state information between each program. By communicating state information between separate program modules, it is possible for a user to access previous screens of data, irrespective of the program module which generated the display, or to advance to previous screens of data if the user has already accessed a previous display. In other words, interactions between separate program modules become seamless in presentation to the user, analogous to how information can be displayed with a internet browser or as if separate program modules were operating under a common shell.

20 Claims, 10 Drawing Sheets

METHOD AND SYSTEM FOR NAVIGATING BETWEEN PROGRAM MODULES

TECHNICAL FIELD

The present invention generally relates to computer systems, and more particularly, the present invention relates to navigation between separate computer program modules.

BACKGROUND OF THE INVENTION

Multiple views or windows in a "Windows"-based computer environment have become necessary for computer navigation. However, these multiple views or windows can generate a disjointed or choppy "feel" for this computer navigation. Further, in the conventional art, a computer user is unable to return to original data content once a "switch" has occurred between separate application programs. In other words, a computer user is unable to utilize a "back" function to jump from one active application program to another inactive application program since such a navigation request is currently limited by the memory of an active individual application program and its prior states.

For example, conventional software products permit forward switching between separate application programs where one application program is cross-linked to another application program. When a user clicks on a link within one application program, the link will activate another inactive application program and display new data based upon this activation. However, users have a tendency to look up after several linking operations and desire to return to a previous application program that provided the original data content in addition to a program link. A back function of the conventional art is limited by the memory of an individual application program and that program's prior states such that it prevents a user from returning to a previous application program. That is, the conventional art prevents a user from returning to an application program containing an encyclopedia article after a user navigates through a linking function to a map contained in another companion application program such as an atlas computer program.

To facilitate switching between separate application programs, the conventional art can provide a simple navigational tool that does not return a computer user to previous data content within an application program. In other words, the conventional art only provides a mechanism that permits switching between application programs without tracking state data or data content between the separate application programs. For example, in the "Windows"-based computer environment, a series of keystrokes can activate a tracking device known as a task manager. Typically, a user activates the task manager by striking the "Alt-tab" key combination to invoke this limited navigation tool. While the task manager does permit a user to switch between currently active application programs, it does not track states within a computer application program that relate to previous iterations of data content. More specifically, this navigational tool does not track state data such as the sequence of previously rendered display screens.

Accordingly, there is a need in the art for a method and system for navigating between separate application programs that provide a cohesive environment between the application programs and a more friendly user experience. In other words, there is a need in the art for a navigational tool that permits a user to navigate easily through a sequence of content pieces both within and between separate application programs or software products. A further need in the art exists for a navigational tool where navigation between separate application programs is substantially seamless to the user such that a user does not observe switching between application programs other than through the data content being displayed to the user on a display device. A further need exists in the art for a navigation tool that minimizes programming for existing software application programs such that substantial retrofitting is unnecessary. Similarly, a further need exists in the art for a navigation tool that can ignore improper or unauthorized attempts to switch between running application programs utilizing conventional methods such as through a task manager. There is a need in the art for a navigational tool that substantially eliminates boundaries between separate application programs or software products such that the overall user experience is substantially enhanced.

SUMMARY OF THE INVENTION

The present invention solves the aforementioned problems by providing a navigation tool that permits access between separate programs by communicating state information between each program. By communicating state information between separate programs, it is possible for a user to access previous screens of data, irrespective of the application which generated the display, or to advance to previous screens of data if the user has already accessed a previous display. In other words, the present invention provides interactions between separate programs that are seamless in presentation to the user, analogous to how information can be displayed with a internet browser or as if separate programs were operating under a common shell.

A user may activate a "back" function that can be part of the user interface of each program to access a previous display generated by a first program when information is currently being displayed by a second program. The user may also activate a "forward" function that can be part of the user interface to access a previous display that was generated by a second program when information is currently being displayed by a first program.

As noted above, conventional separate programs typically permit access to previous information displayed only by a current active program. That is, "forward" and "back" functions of the conventional art are usually limited by the memory of an individual, active program to only its prior states. The conventional art typically prevents a user from returning to a first program after linking to or opening a second program.

In contrast, the present invention uses communication between separate programs about program states to permit access to previously displayed information, irrespective of the program that generated the prior information. The term "state" can be defined as a program's configuration, attributes, condition, or information content at an instant in time. The state of a program can be usually temporary (i.e. it changes with time) and volatile (i.e. it will be lost or reset to some initial state if the program is reset). While the present invention can be used for state communication and data flow between separate programs, it can also be used if navigation occurs only within a single program, such as through mechanisms referred to as internal links.

The present invention can track state information with a state index, a modified uniform resource locator (URL), and by storing content information related to a particular display, referred to as state data. The state index can be a counter or some other tracking mechanism that can be associated with the state data. That is, the state index can direct a program to the appropriate stored state data in order to render a display that is consistent with the sequence or timing of displays with the user interface. Each program can have its own state index and can be capable of generating a modified URL. In the exemplary embodiment, a state engine can track the state index and generate the modified URL for a particular program. While each program can have its own state engine, each state engine of a program may not be a distinct object or a discrete part of the computer code. In other words, the state engine may comprise lines of code that are interwoven within existing code of a particular program.

Each state engine of a particular program can pass state information between separate applications with the modified URL. The modified URL may contain (1) a protocol prefix identifying a destination application, (2) data that is to be manipulated by the destination program, and (3) state information describing (a) how the current URL was generated and (b) the name of the originating program that was active or had focus on a display device. The format of the modified uniform resource locator can be as follows:

protocol prefix://data to be manipulated or forwarded/via=target activity/from=originating application identifier The "protocol prefix" can denote the destination application while the "via" parameter can indicate how the current URL was generated. For example, "via=back," can denote the activity of "back" button activation, while "via=forward" can indicate "forward" button activation, and "via=user" can denote clicking on a link or an item generated from a search engine. The "from" parameter can denote the originating program identifier. For example, information being accessed by leaving an originating program (ORG1) to enter a destination program (DST2) upon activation of a "forward" button can generate the following URL:

DST2://data to be manipulated/via=forward/from=ORG1

DETAILED DESCRIPTION OF THE EXEMPLARY EMBODIMENTS

Figure 1:
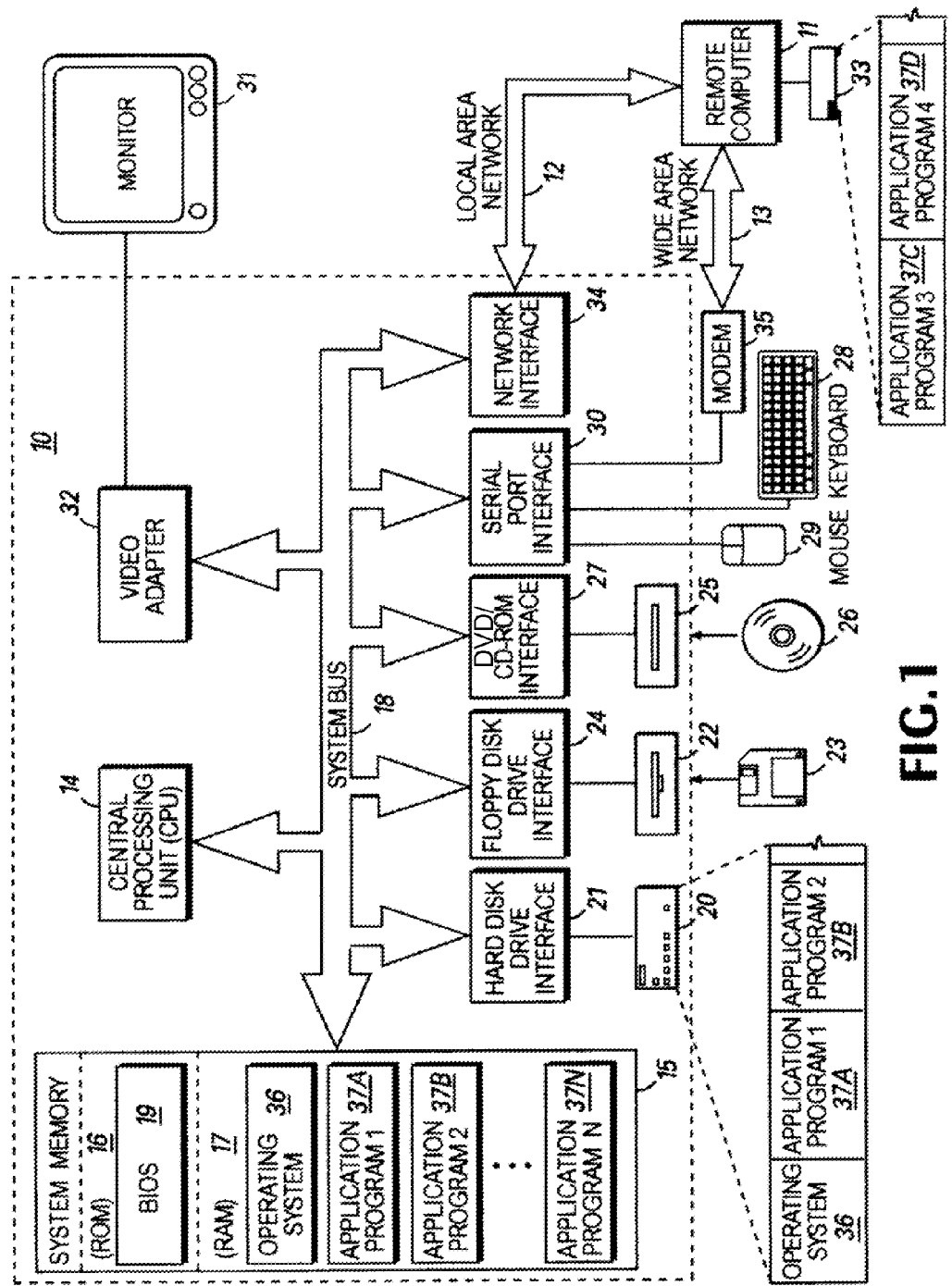
FIG. 1 is a block diagram of a network personal computer that provides the exemplary operating environment for the present invention.

With the present invention, a user can access previous screens of data, irrespective of the program which generated the display, or advance to previous screens of data if the user has already accessed a previous display by communicating state information between separate programs. In other words, the present invention provides interactions between separate programs that are seamless in presentation to the user, analogous to how information can be displayed with a internet browser or as if separate programs were operating under a common shell.

The present invention permits navigation between separate programs while providing a cohesive environment between the programs and a more friendly user experience. In other words, the present invention provides a navigational tool that permits a user to navigate easily through a sequence of content pieces both within and between separate programs or software products. Navigation with the present invention between separate programs is substantially seamless to the user such that a user does not observe switching between programs other than through the data content being displayed to the user on a display device. The navigation tool of the present invention minimizes programming for existing software programs such that substantial retrofitting is unnecessary. In a way, the navigational tool of the present invention substantially eliminates boundaries between separate programs or software products such that the overall user experience is substantially enhanced.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a central processing unit (CPU), memory storage devices for the CPU, display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Referring now to the drawings, in which like numerals represent like elements throughout the several figures, aspects of the present invention and the preferred operating environment will be described.

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a central processing unit (CPU) 14, such as "PENTIUM" microprocessors manufactured by Intel Corporation of Santa Clara, Calif. The personal computer also includes system memory 15, including read only memory (ROM) 16 and random access memory (RAM) 17, which is connected to the CPU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM OR DVD drive 25, which is used to read a CD-ROM OR DVD disk 26, is connected to the system bus 18 via a CD-ROM OR DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM OR DVD drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art can recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Figure 2A:
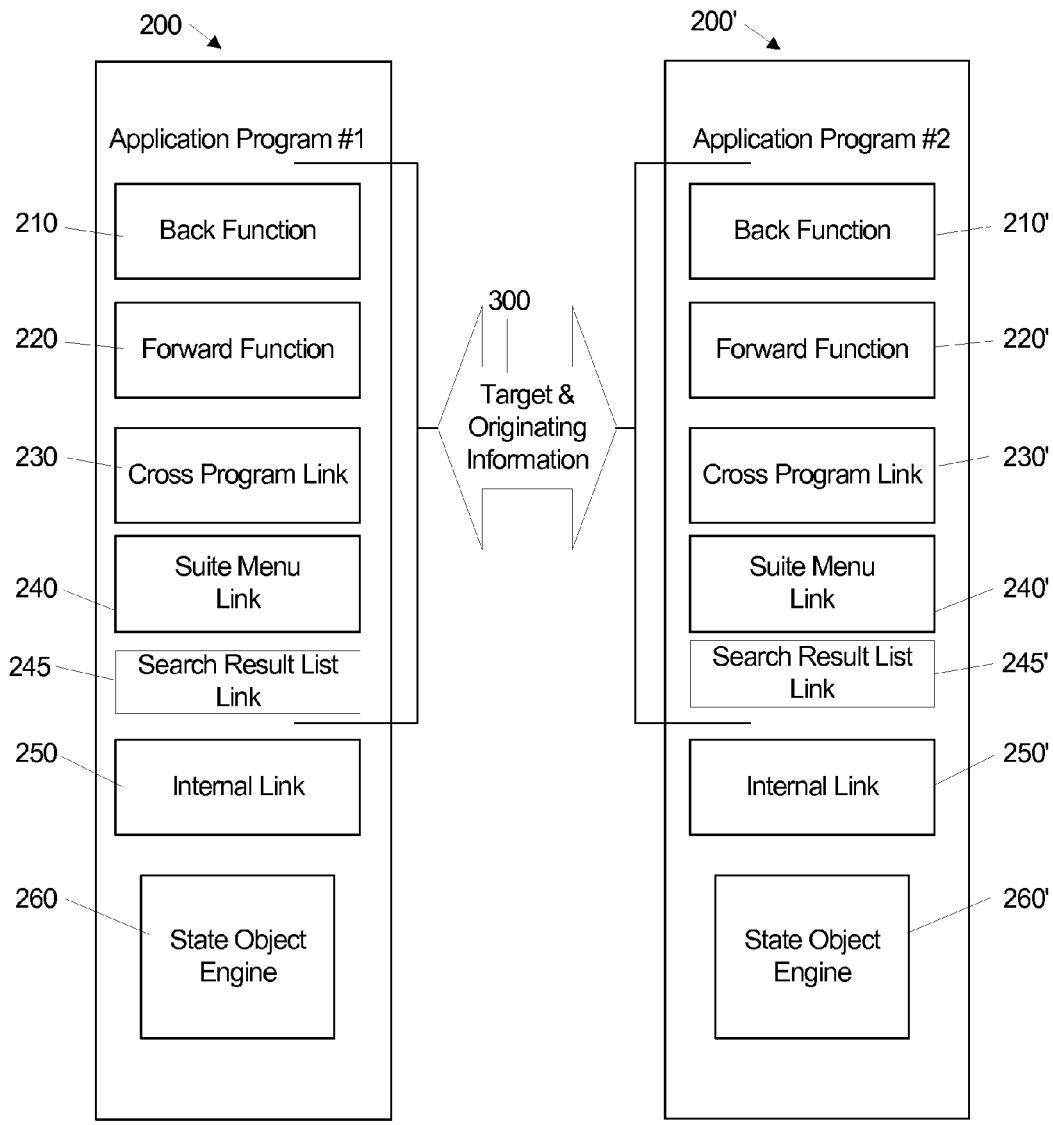
FIG. 2A is a functional block diagram illustrating an exemplary navigational tool system for the present invention.

Those skilled in the art will understand that program modules such as an operating system 36, application programs 37, and data are provided to the personal computer 10 via computer-readable media. In the preferred computer, the computer-readable media include the local or remote memory storage devices, which may include the local hard disk drive 20, floppy disk 23, CD-ROM OR DVD 26, RAM 17, ROM 16, and the remote memory storage device 33. In the preferred personal computer 10, the local hard disk drive 20 is used to store data and programs, including the operating system and programs. Referring now to FIG. 2A, a functional block diagram illustrating a navigational tool system for the present invention will be described. FIG. 2A also illustrates an exemplary interaction between two separate application programs. A first application program 200 can have a plurality of navigational tools that may include a back function 210, a forward function 220, a cross program link 230, a suite menu link 240, a search result list link 245, and an internal link 250. Those skilled in the art will appreciate that the navigational tools of an application program operating in accordance with the present invention are not limited to the navigational tools illustrated in FIG. 2A. The present invention can include any navigational tool that provides for data routing between one or more separate application programs or for navigation within a single application program.

The back function 210 enables a user to navigate or return to previously displayed data rendered on the computer monitor 31. In other words, the back function 210 enables a user to return to previously displayed data, irrespective of the application program that generated the previously displayed data. Similarly, the forward function 220 enables a user to navigate to data content previously generated by the application program that the user was currently in or another application program that was previously active. The forward function 220 usually becomes available to the user after the back function 210 or another linking function has been utilized. Stated simply, the forward function 220 usually can be utilized if a user navigates through historical or previously displayed data. The back and forward functions 210, 220 can be activated by screen display devices such as a toolbar or by activating an appropriate key on a keyboard device 28.

The cross program link 230 enables a user to jump or move from data content being displayed by a first application program to data content that can be displayed by a second application program. The cross program link 230 is typically embedded in text data of one application program. However, other cross program links are not beyond the scope of the present invention. Other cross program links 230 can include, but are not limited to, graphical images, screen display buttons forming part of a toolbar, and other like graphical user interfaces.

The suite menu link 240 is a navigational tool that can be a hybrid between an explicit task switching device and a cross program link 230. In other words, the suite menu link 240 enables a user to jump or move from an originating application program to a target application program, irrespective of the state of the target application program. The suite menu link 240 can be a substitute for explicit task switching devices such as the "alt-tab" and "task bar" methods in a "Windows"-based operating environment. Because the cross program link 230 can replace the aforementioned task switching devices, any switching request generated by these conventional task switching devices will be ignored by the present invention so that the tracking of a state index and state data (discussed later) of each application program can be properly maintained.

Similar to the cross program link 230, the search result list link 245 enables a user to jump from an originating application program (such as the first application program 200) to a target application program (such as the second application program 200') and vice-versa. The search result list link 245 is typically text data that is generated as a result of a query conducted by a search engine of an application program. The text data of the search result list link 245 are typically topics that provide a user with an overview or summary of any data associated with the topic headings.

The search result list link 245 and the cross program link 230, as well as the suite menu link 240 share a common function. These links can open a closed target application program. In other words, the aforementioned links can launch a target application program based upon a navigation request existing within an open originating application program.

Unlike the back function 210 and forward function 220, as well as the aforementioned links 230, 240 and 245, the internal link 250 provides for navigation within a single application program. The internal link 250 is similar to the cross program link 230 in that the link can be embedded in text data. However, other forms of the internal link 250 are not beyond the scope of the present invention. Other forms of the internal links 250 include, but are not limited to, graphical screen elements that contain links as well as screen display interfaces such as buttons on a toolbar. The internal link is designed for navigation through data within a single application program, such as "jumping" to a definition like text data 270.

Except for the internal link 250, the remaining links can forward information to a target application program. That is, the back function 210, the forward function 220, cross program link 230, suite menu link 240, and search result list link 245 of an originating application program such as first application program 200 can communicate target and originating information 300 to a target application program such as the second application program 200'. It is noted that after a "switch" occurs, the first application 200 program will become the target application program and the second application program 200' will become the original application program in a two program navigational environment.

The target application program 200' can include similar navigational tools as =those described with respect to the originating application program 200. Both the originating application program such as the first application program 200 and the target application program such as the second application program 200' can have state object engines 260, 260' that can track a state index and state data for a respective application program. As mentioned above, the state object engine 260 or 260' may not be a distinct object or a discrete part of the computer code. In other words, the state object engine 260 or 260' may comprise lines of code that are interwoven with existing code of a particular application program. Each application program can have its own state index and can be capable of generating a modified uniform resource locator. Also noted above, the term "state" can be defined as an application program's configuration, attributes, condition, or information content at an instant in time. The state of an application program can be usually temporary (i.e., it changes with time) and volatile, (i.e., it will be lost or reset to some initial state if the application program is reset).

Figure 3A:
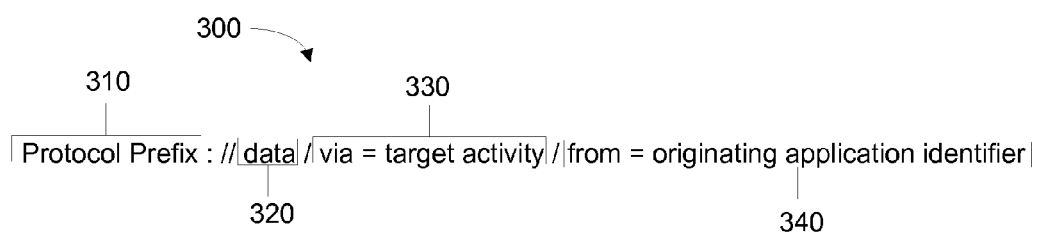
FIG. 3A illustrates an exemplary format of a message that can be passed between separate programs or within a single program.

A state object engine 260 of an originating application program 200 communicates target and originating information 300 to a target application program 200'. The target and originating information 300 typically comprises a message that may take the form of a modified uniform resource locator (URL) as illustrated in FIG. 3A. The modified URL may contain a protocol prefix 310, data 320, state generation information 330, and origination information 340 such as the name of the originating application program that was active or last had focus. The protocol prefix 310 is typically an abbreviation that identifies the name of a target application.

The data 320 can be information that can be manipulated by the target application program upon its receipt of the target and originating information message 300. The state generation information 330 is typically data that describes how the current URL or message 300 was generated. For example, "via=back", can denote the activity of "back" button activation, while "via=forward" can indicate "forward" button activation. Similarly, "via=user" can denote clicking on a cross program link 230 or an item generated from a search engine such as a search result list link 245. In some embodiments, the target generation information 330 can remain blank for the activation of a navigational tool. For example, the target generation information 330 can remain blank except for navigation requests that are produced by "back", "forward", or "suite menu link" activation.

The origination information 340 of the target and originating information message or URL 300 can denote the originating application program identifier. For example, information being accessed by leaving an originating application program having an application program identifier (ORG 1) to enter a target application program having an application program identifier (TRG 2) upon activation of a "forward" button can generate the following message 300:

TRG 2://data/via=forward/from=ORG1

Figure 2B:
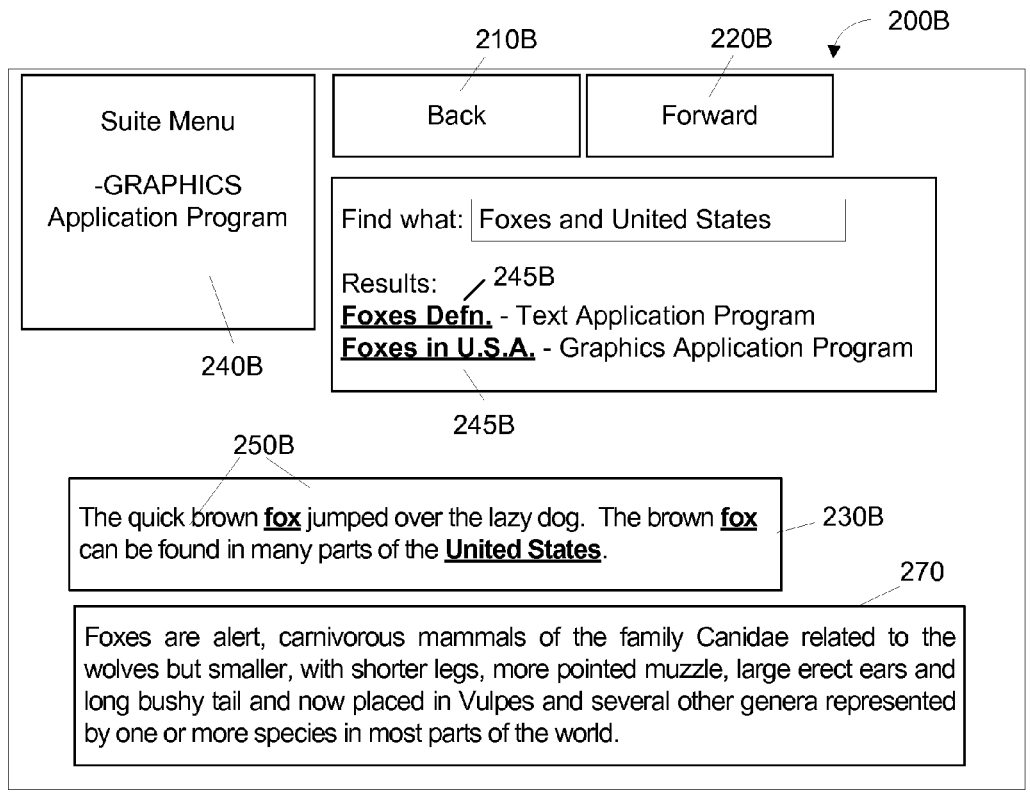
FIG. 2B is an exemplary display screen of a text program that illustrates various navigational tools for the present invention.

FIG. 2B illustrates an exemplary display screen 200B that can be generated by the originating application program such as first application program 200. The display screen 200B includes a back function button 210B, a forward button 220B, a cross program link 230B, a suite menu link button 240B, search result list link links 245B, and internal links 250B. Upon activation of the "fox" link or internal link 250B text data 270 can be displayed. The originating application program 200 can be a text application program such as an interactive encyclopedia. However, the present invention is not limited to this example and can include other application programs such as word processing programs like Microsoft Word, spreadsheets such as Microsoft Excel, graphical application programs such as Microsoft Power-Point, Visio, and other similar application programs.

When a user desires to access information in a target application program such as the second application program 200', the user can navigate to the target application program by activating one of the appropriate links. For example, the user can access the target application program 200' by activating the suite menu link 240B, an appropriate search result list link 245B, or a cross program link 230B. If the display 200'C of target application program 200' was previously viewed by a user, then the back function button 210B could be activated. If the originating application program 200 having a display state of 200B was rendered by activating the back function button 210' of the target application program 200', then the forward button 220B could be activated to navigate to the target application program 200' having a display state of 200'C. Similarly, the forward button 220B can be utilized when the display screen 200B was rendered based upon another program link such as a cross program link 230, a suite menu link 240'C, or search result list link 245'C.

Figure 2C:
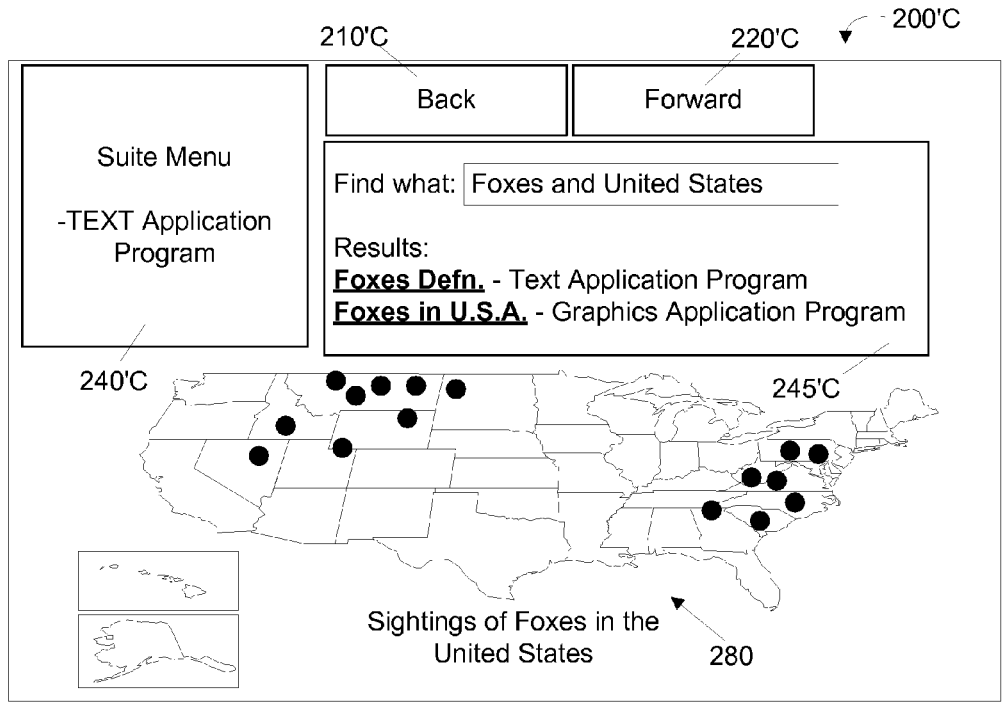
FIG. 2C is an exemplary display screen of a graphics program that illustrates various navigational tools for the present invention.

When a user activates the "Foxes in U.S.A." search result link 245B or another link such as the back button 210B (if appropriate), the forward button 220B (if appropriate), or the suite menu link 240B, the user can access the exemplary target application display screen 200'C illustrated in FIG. 2C. The exemplary display screen 200'C can be generated by a graphics application program such as an interactive world atlas. Similar to the text application program screen display 200B, the display screen 200'C includes a back button 210'C, a forward button 220'C, a cross program link in the form of a graphical image 280, and a suite menu link button 240'C.

Basically, the exemplary target application display screen 200'C demonstrates data that can be generated by a target application program 200' in response to a navigation request from the originating application program 200 (as illustrated in FIG. 2B). More specifically, when a user desires to view information or data contained in a target application program, the user can activate any one of the aforementioned links. For example, referring back to FIG. 2B, when a user desires to see data related to a topic such as the topic of "Foxes in the United States", a user can activate the appropriate search result list link 245B titled "Foxes in U.S.A.," or the suite menu link 240B, or the cross program link 230B. If appropriate, the back button 210B or the forward button 220B can be utilized to access the target application program 200'. The display screen 200'C demonstrates how navigation between the originating application program 200 and the target application program 200' can be made seamless by providing similar navigational tools such as the back button 210'C, the forward button 220'C, a suite menu link 240'C, and a search result list link 245'C.

Figure 3B:
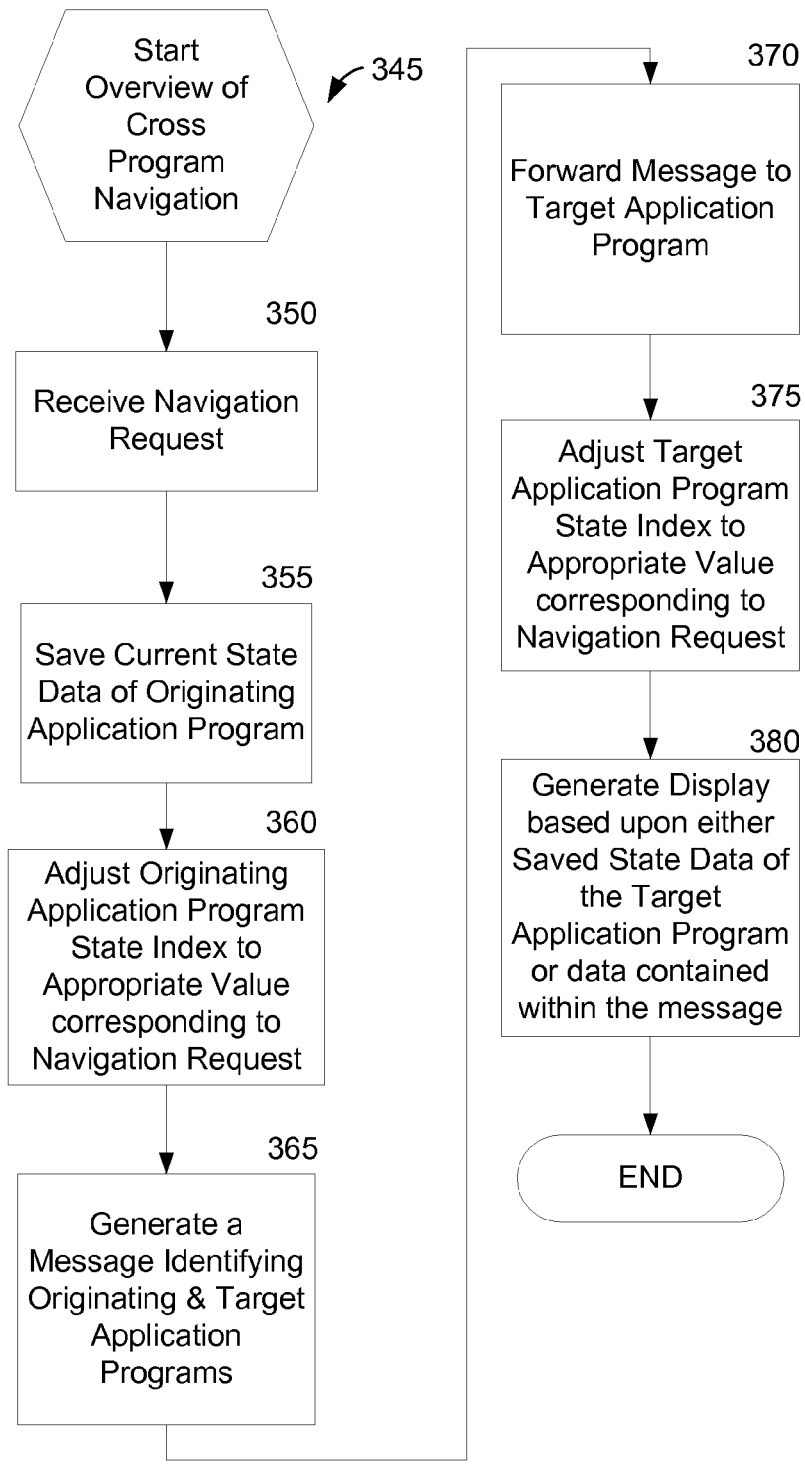
FIG. 3B is a logic flow diagram illustrating an overview of an exemplary process for navigating between separate programs.

FIG. 3B is an exemplary logic flow diagram of a computer-implemented process for navigating between separate application programs. FIG. 3B provides an overview of the entire process where step 350 is the first step of the navigation process 345. In step 350, a navigation request from an originating application can be acquired. Such a navigation request can include an activation of any one of the aforementioned links in addition to the internal links 250B as illustrated in FIG. 2B. In step 355, the current state data of the originating application program 200 can be saved. The state data can include the originating application program's configuration, attributes, condition, or information content in an instant in time. For example, such state data can include, but is not limited to, the information content that includes the internal links 250B and cross program link 230B as well as the internal link information 270 as set forth in FIG. 2B. In addition to the actual information content within screen display 200B, the spatial arrangement or location of the data can also be saved as state data.

After step 355, in step 360, the state index of the originating application program can be adjusted to an appropriate value corresponding to the navigation request. The state index can take the form of a counter variable that is increased or decreased, depending on the navigation request. For example, if a cross program link 230, a forward function 220, a suite menu link 240, or search result link 245 is activated, then the state index of the originating application program 200 can be increased. Alternatively, if a back function 210 is activated, then the state index of the originating application program can be decreased. The adjustment of the state index for an originating application program or a target application program will become more apparent to the reader after reviewing the following flow charts as well as reviewing a hypothetical series of navigation requests as will be discussed hereinbelow.

Subsequently, in step 365, a message 300 identifying the originating and target application programs is generated. Next, in step 370, this message 300 is forwarded to the target application program 200'. The state index of the target application program 200' is then adjusted to an appropriate value corresponding to the navigation request as set forth in step 375. Similar to the originating application program 200, the adjustment to the state index of the target application program 200' will depend upon the type of navigation request invoked by the user. In step 380, a display based upon either saved state data of the target application program 200' or data contained within the message 300 is generated. FIG. 3B illustrates the computer-implemented process for navigation between separate application programs in addition to the computer-implemented process for navigating within a single application program. In the case of navigating within a single application program, steps 360–375 would be eliminated.

Figure 4:
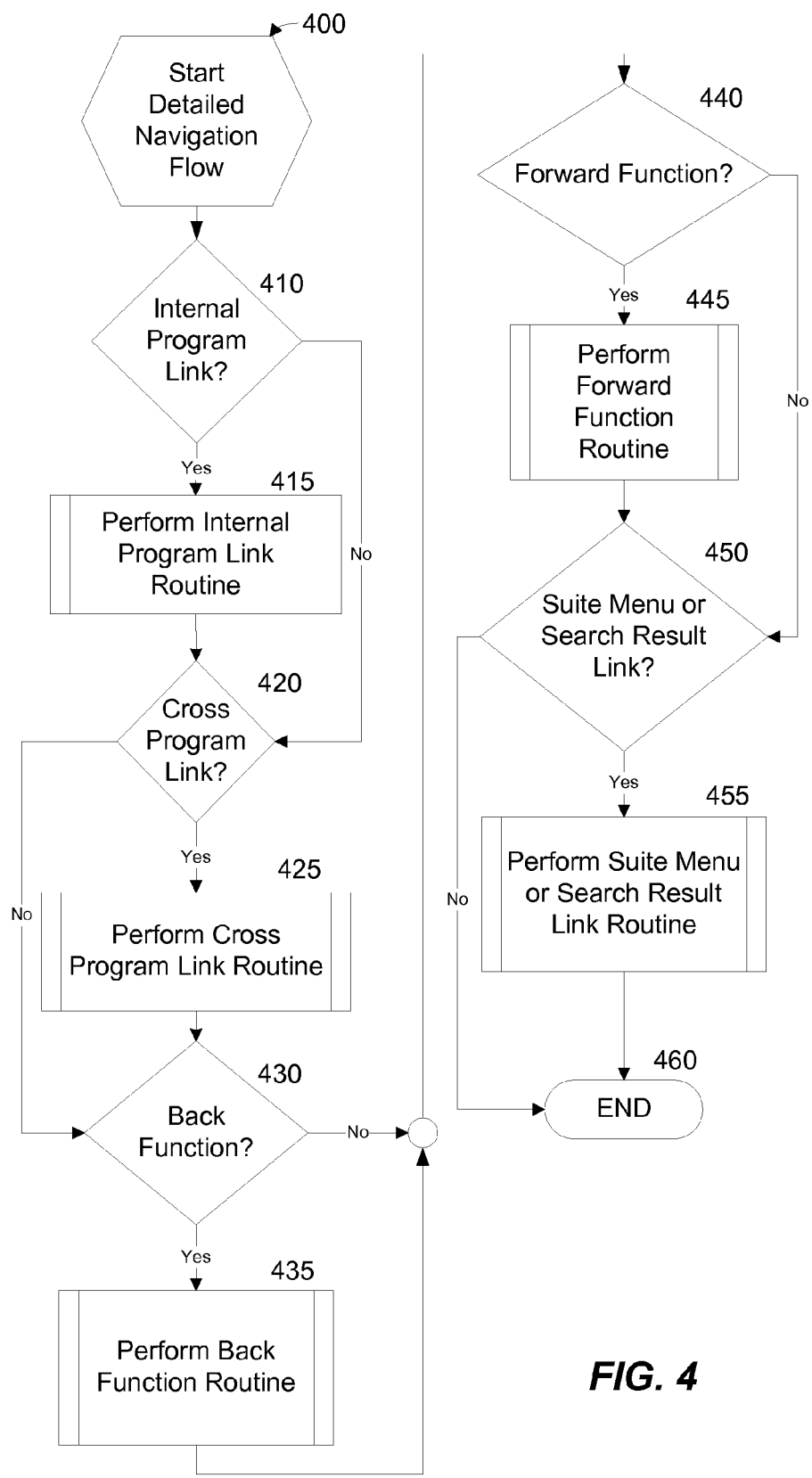
FIG. 4 is a logic flow diagram illustrating a detailed exemplary process for navigating between separate programs.

Referring now to FIG. 4, a logic flow diagram illustrating a detailed exemplary computer-implemented process for navigating between separate application programs will be described. Decision step 410 is the first step of the detailed navigation process 400. In decision step 410, it is determined whether an internal program link such as the internal program links to 250B have been activated. If the inquiry to decision step 410 is positive, then the "yes" branch is followed to routine 415 in which the internal program link routine is performed. If the inquiry to decision step 410 is negative, then the "no" branch is followed to decision step 420.

In decision step 420, it is determined whether a cross program link such as cross program link 230B illustrated in FIG. 2B has been activated. If the inquiry to decision step 420 is positive, then the "yes" branch is followed to routine 425 in which the cross program link routine is performed. If the inquiry to decision step 420 is negative, then the "no" branch is followed to decision step 430.

In decision step 430, it is determined whether a back function such as the back function button 210 illustrated in FIG. 2B has been activated. If the inquiry to decision step 430 is positive, then the "yes" is followed to routine 435 in which the back function routine is performed. If the inquiry to decision step 430 is negative, then the "no" branch is followed to decision step 440.

In decision step 440, it is determined whether the forward function has been activated such as the forward function button 220B as illustrated in FIG. 2B. If the inquiry to decision step 440 is positive, then the "yes" branch is followed to routine 445 in which the forward function routine is performed. If the inquiry to decision step 440 is negative, then the "no" branch is followed to decision step 450.

In decision step 450, it is determined whether a suite menu link or a search result link has been activated such as the suite menu link 240B or search result link 245B as illustrated in FIG. 2B. If the inquiry to decision step 450 is positive, then the "yes" branch is followed to routine 455 in which the suite menu link or search result link routine is performed. If the inquiry is decision step 450 is negative, then the "no" branch is followed to the last step 460.

Figure 5:
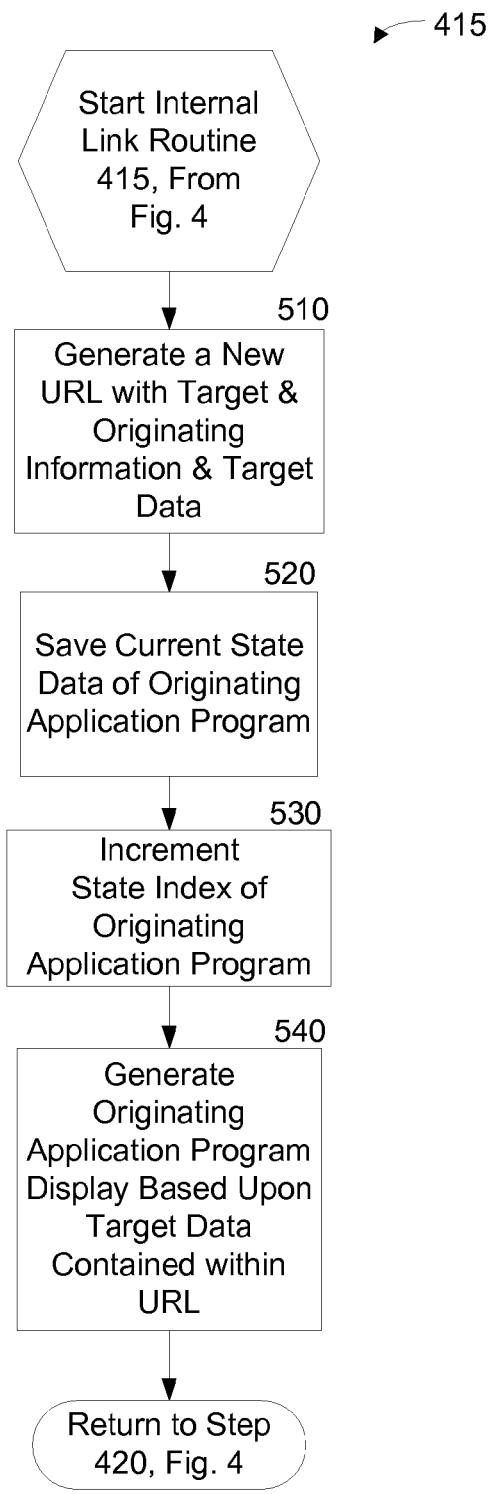
FIG. 5 is a logic flow diagram illustrating an exemplary process for navigating within a single program upon activation of an internal link.

FIG. 5 illustrates an exemplary computer-implemented process for routine 415 in which the internal link function is performed. Internal link routine 415 starts with the step 510 in which a new URL with target and originating information and target data is created. This URL can be the target and originating information message 300 as illustrated in FIGS. 2A and 3A. Subsequently, in step 520, the current state data of the originating application program 200 is saved. As explained above, this state data can include, but is not limited to, the information content that includes the information containing internal links 250B and cross program link 230B as well as the internal link information 270 as illustrated in FIG. 2B. In addition to the actual information content within the display 200B, the spatial arrangement or location of data can also be saved as state data.

In step 530, the state index of the originating application program 200 is increased or incremented. The state index can be a counter device that tracks the state of a respective application program. In step 540, the originating application program 200 can display data based upon the target data contained within the URL or message 300. For example, if one of the internal links 250B as illustrated in FIG. 2B are activated, the steps of internal link routine 415 would be carried out and the originating application program 200 would then display internal link information 270 as set forth in FIG. 2B.

Figure 6:
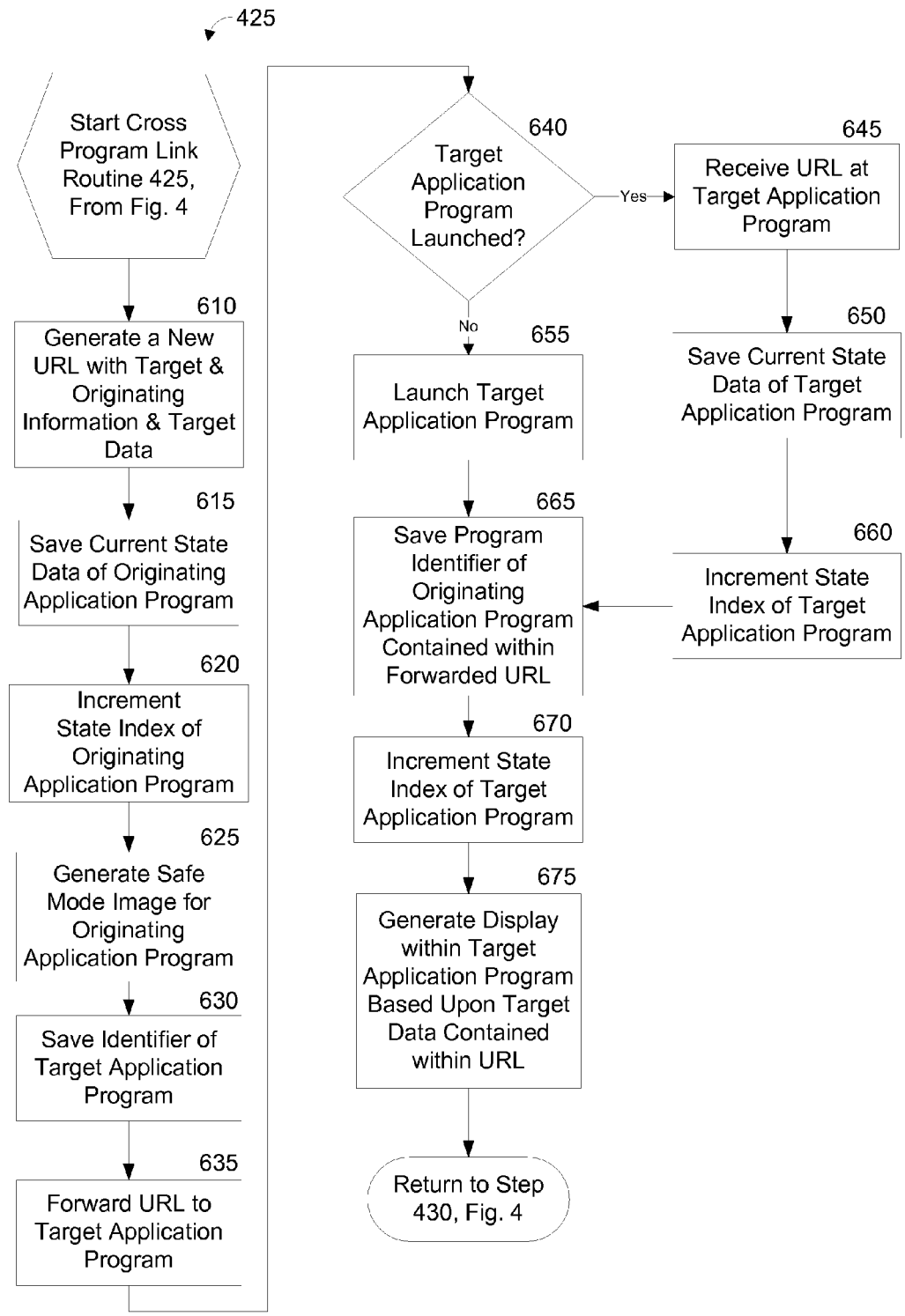
FIG. 6 is a logic flow diagram illustrating an exemplary process for navigating between separate programs upon activation of a cross program link.

FIG. 6 illustrates an exemplary computer-implemented process for the cross program link routine 425 in which navigation occurs between two separate application programs. Cross program link routine 425 starts with step 610 in which a new URL or message 300 containing target and originating information and target data is generated. Next, in step 615, the current state data of the originating application program 200 is saved. In step 620, the state index of the originating application program 200 is incremented.

In step 625, a safe mode image for the originating application program display 200B is generated. This safe mode image or display (not shown in the drawings) can be a scaled down version of the current display state in order to prevent the originating application program 200 from attempting to access data that could exist on a removable storage medium, such as CD-ROM or DVD disk 26 or magnetic diskette 23.

In other words, a safe mode display for exemplary screen display 200B could be a display where the Link Information 270 or the information content that includes internal links 250B or both could be eliminated while the remaining elements, such as the search result list link links 245B would remain in tact in order to reduce memory storage requirements. Such a safe mode display will provide the user with enough information such that it would be familiar to the user. If a user does inadvertently reach such a safe mode of display while navigating between separate application programs, the user could be prompted with a dialog box to request that the appropriate removable storage medium such as the CD-ROM or DVD disk 26 or magnetic diskette 23 be reinserted into the appropriate reading device.

After step 625, in step 630, the identifier of the target application program such as the second application program 200' is saved. The identifier for the target application program 200' can be stored within the originating application program 200 or in a memory area accessible by the originating application program 200B. Subsequently, in step 635 the URL or message 300 is forwarded to the target application program 200'. The new URL or message 300 that is generated can take the form of the following:

TRG2://United States/Via=User/From=ORG1.

In decision step 640 it is determined whether the target application program has been launched. If the inquiry to decision step 640 is positive, then the "yes" branch is followed to step 645 in which the URL or message 300 is received by the target application program. Next, in step 650, the current state data of the target application program is saved. In step 660, the state index of the target application program is incremented. If the inquiry to decision step 640 is negative, then the "no" branch is follow to step 655 in which the target application program is launched.

In step 665, the program identifier of the originating application program 200 contained within the forwarded URL or Message 300 is saved. This identifier for the originating application program can be stored within the target application program or in a memory area accessible by the target application program. Next, in step 670, the state index of the target application program is again incremented. In step 675, a display such as the display 200'C within the target application program 200' can be generated based upon the target data contained within the URL or message 300. According to the previous example, the target data would be "United States". Next, the process returns to step 430 of FIG. 4.

Figure 7:
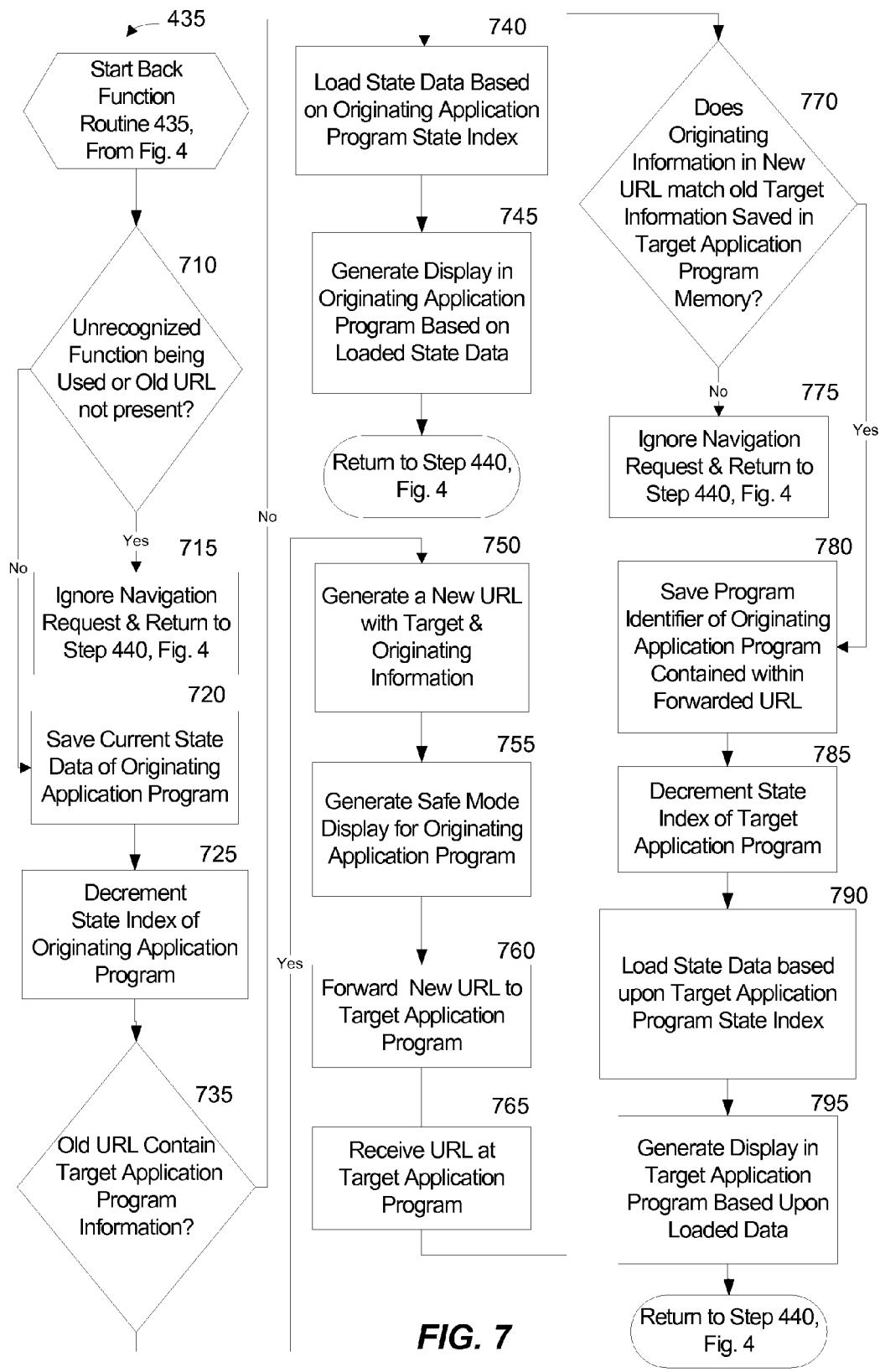
FIG. 7 is a logic flow diagram illustrating an exemplary process for navigating between separate programs upon activation of a back function.

FIG. 7 illustrates another exemplary computer-implemented process for the back function routine 435 illustrated in FIG. 4. In the back function Routine 435, step 710 is the first step of the process where it is determined whether an unrecognized function is being used or if an old URL or message 300 is not present. In other words, in decision step 710, it is determined whether a user is trying to navigate between separate application programs by utilizing a switching device such as the "alt-tab" and "task bar" methods in a "Windows"-based operating environment. Further, in this step, it is also determined whether or not a history of states exists.

Stated differently, as noted above, the back function 210 and forward function 220 can only be utilized if a user had navigated previously by one of the aforementioned links that would include the back function 210 itself (if appropriate), the forward function 220 itself (if appropriate), the cross program link 230, the suite menu link 240, the search result list link 245, and the internal link 250. If there is no navigation history or state history, then the activation of the back function would be ignored. In other words, if the inquiry to decision step 710 is positive, then the "yes" branch would be followed to step 715 in which the navigation request is ignored and the process would then return to step 440 of FIG. 4.

If the inquiry to decision step 710 is negative, then the "no" branch would be followed to step 720 in which the current state data of the originating application program 200 would be saved. Subsequently, in step 725, the state index of the originating application program 200 would then be decreased or decremented. In decision step 735, it is determined whether an old URL or old message 300 saved from a previous navigation contains target application program information. In other words, in this step, it is determined whether current navigation is to occur within a single application program or within another target application program. If the inquiry to decision step 735 is negative, then the "no" branch is followed to step 740 in which the state data based on the originating application program 200 state index is loaded. In step 745, a display is generated, such as internal link information 270, in the originating application program 200 based upon the loaded state data. The process then returns to step 440 of FIG. 4.

If the inquiry to decision step 735 is positive, then the "yes" branch is follow to step 750 in which a new URL or message 300 with target and originating information is generated. For example, the new URL or message 300 that is generated could take the form of the following:

TRG2://_/Via=back/from=ORG1

Next, in step 755, a safe mode display for the originating application program 200 is generated. In step 760, the new URL or message 300 is forwarded to the target application program 200'. In step 765, the URL or message 300 is received at the target application program 200'.

Subsequently, in decision step 770, it is determined whether the originating information in the new URL or message 300 matches the old target information saved in the target application program's 200'C memory. However, the old target information can be stored within the target application program 200' or in a memory area accessible by the target application program 200'. If the old target information saved in the target application does not match the originating information contained in the new URL or message 300 or, in other words, if the inquiry to decision step 770 is negative, then the "no" branch is follow to step 775 in which the navigation request is ignored and the process returns to step 440 of FIG. 4.

If the inquiry to decision step 770 is negative, then the "yes" branch is followed to step 780 in which the program identifier of the originating application program 200 contained within the forwarded URL or message 300 is saved. Next, in step 785, the state index of a target application program 200' is decremented. In step 790, the state data based upon the target application program 200' is loaded. In step 795, a display 200'C in the target application program 200' based upon the loaded state data is generated. For example, if display screen 200B was currently being displayed based upon a forward navigation and display screen 200C was the last active screen viewed, then the back button 210B would cause display 200'C to be displayed again. The process then returns to step 440 of Fig. B.

Figure 8:
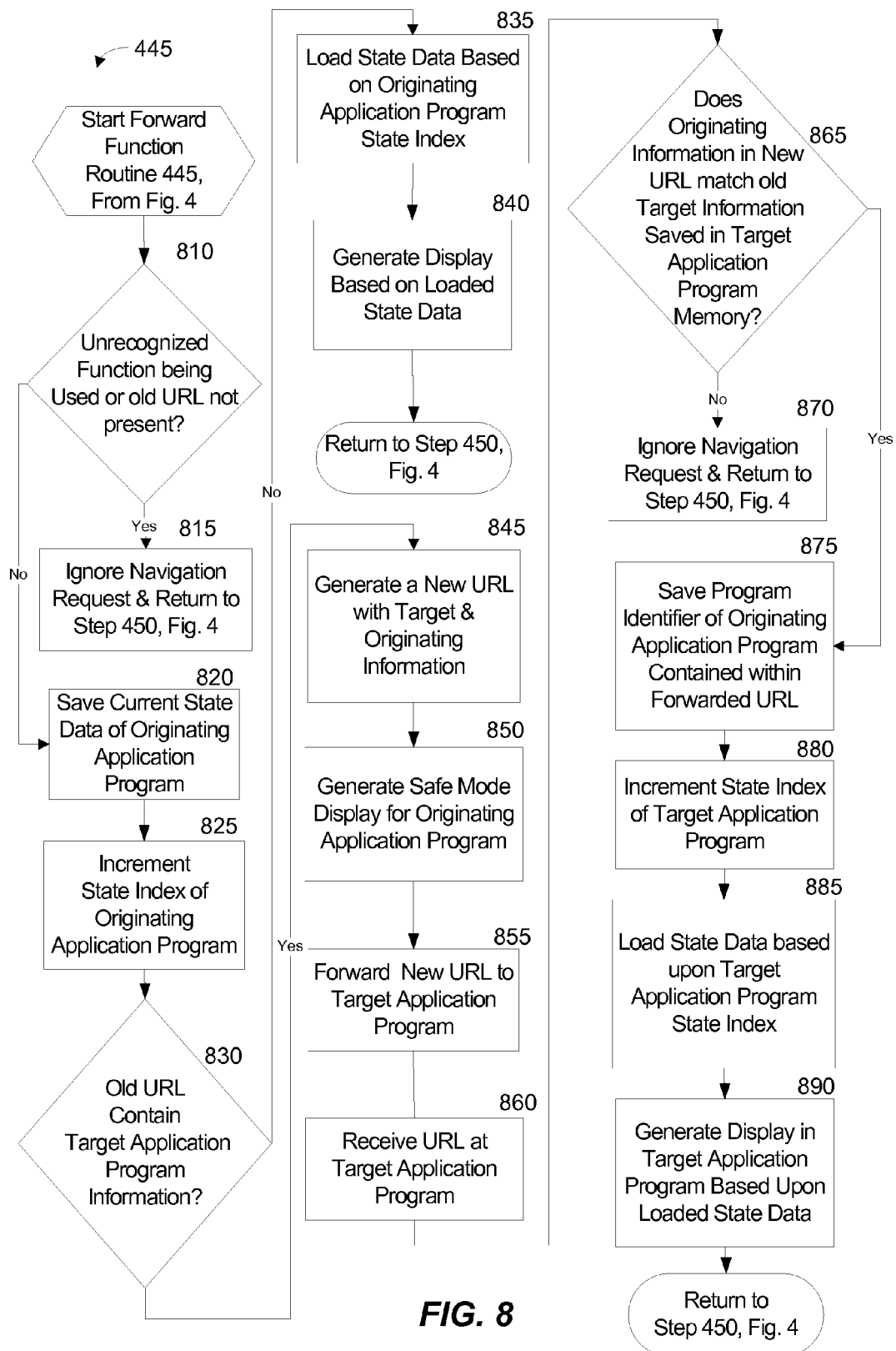
FIG. 8 is a logic flow diagram illustrating an exemplary process for navigating between separate programs upon activation of a forward function.

FIG. 8 illustrates yet another exemplary computer-implemented process for the forward function Routine 445 of FIG. 4. It is noted that the forward function routine 445 is very similar to the back function routine 435 as set forth in FIG. 7. The major difference between these routines exists in the direction of how the state index is adjusted. For the forward function routine 445, the state index is usually incremented while in the back function routine 435, the state index of an application program is usually decremented. For the sake of clarity and accuracy, all of the steps illustrated in FIG. 8 will be discussed.

Step 810 is the first step of the forward function routine 445 where forward navigation occurs between separate application programs. In decision step 810, it is determined whether an unrecognized function is being activated or if an old URL or message 300 is not present, similar to step 710 of FIG. 7. If the inquiry to decision step 810 is positive, then the "yes" branch is followed to step 815 in which the navigation request is ignored and the process returns to step 450 of FIG. 4. If the inquiry to decision step 810 is negative, then the "no" branch is followed to step 820. In step 820 the current state data of the originating application program 200 is saved.

In step 825, the state index of the originating application program 200 is incremented. Next, in decision step 830 (similar to decision step 735 of FIG. 7), it is determined whether the old URL or message 300 contains target application program 200' information. If the inquiry to decision step 830 is negative, then the "no" branch is followed to step 835 in which the state data based upon the originating application program 200 state index is loaded. In step 840, a display 200B based on the loaded state data, such as internal link information 270, is generated. The process then returns to step 450 of FIG. 4.

If the inquiry to decision step 830 is positive, then the "yes" branch is followed to step 845 in which a new URL or message 300 with target and originating information is generated. For example, the new URL or message 300 that is generated could take the form of the following:

TRG2://_/via=forward/from=ORG1

In step 850, a safe mode display for the originating application program 200 is generated. Next, the new URL or message 300 is forwarded to the target application program 200'. In step 860, the URL or new message 300 is received at the target application program 200'. After step 860 in decision step 865, it is determined whether the originating information in the new URL or message 300 matches the old target information saved in the target application program's 200' memory. If the inquiry to decision step 865 is negative, then the "no" branch is followed to step 870 in which the navigation request is ignored and the process returns to step 450 of FIG. 4.

If the inquiry to decision step 865 is positive, then the "yes" branch is followed to step 875 in which the program identifier of the originating application program 200 contained within the forwarded URL or message 300 is saved. In step 880, the state index of the target application program 200' is incremented. In step 885, the state data based upon the target application program 200' state index is then loaded. Subsequently, in step 890, a display in the target application program 200' based upon the loaded state data is generated. The process then returns to step 450 of FIG. 4.

Figure 9:
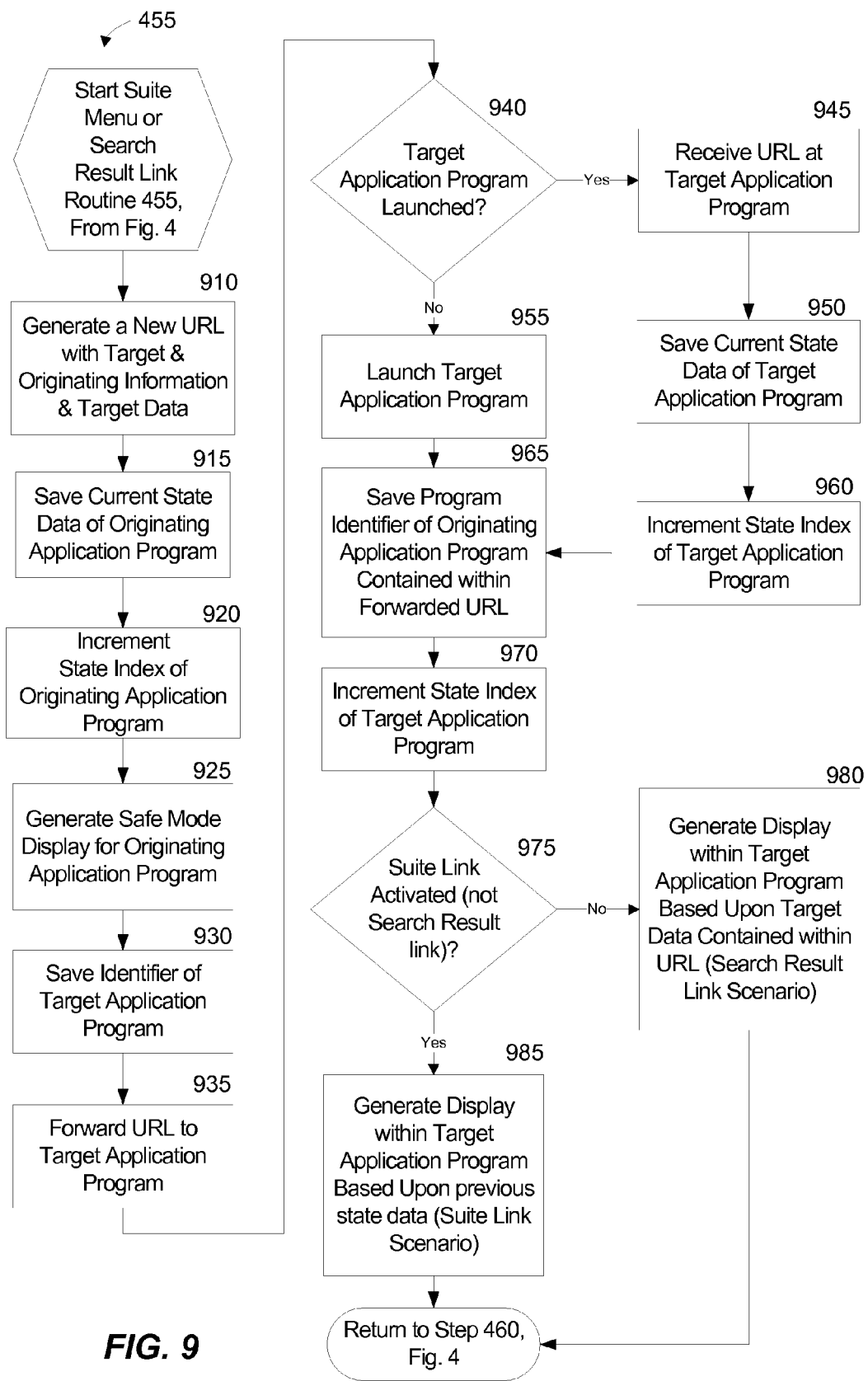
FIG. 9 is logic flow diagram illustrating an exemplary process for navigating to a program upon activation of either a suite menu or search result link.

FIG. 9 illustrates yet another exemplary computer-implemented process for a suite menu link or search result link routine 455 as set forth in FIG. 4. The suite menu link or search result link routine 455 is very similar to the cross program link routine 425 as set forth in FIG. 6. One difference between the suite menu link or search result link routine 455 and the cross-program link routine 425 exists in step 985 (discussed below) pertaining to generating a display within a target application program 200' based upon previous state data.

Step 910 is the first step of routine 455 in which a new URL or message 300 with target and originating information and target data is generated. For example, in the search result list link scenario, the new URL or message 300 could take the form of the following:

TRG2://_/Via=User/from=ORG1

In the suite menu link scenario, target data would not be present or would be included in the new URL or message 300 as the target data. For example, the new URL or message 300 in this case could take the form of the following:

TRG2://Foxes in U.S.A./Via=User/from=ORG1

In step 915, the current state data of the originating application program 200 is saved. In step 920, the state index of the originating application program 200 is then incremented. Subsequently, in step 925, a safe mode display for the originating application program 200 is generated. In step 930, the identifier of the target application is saved.

In step 935, the URL or message 300 is forwarded to the target application program 200'. In decision 940, it is determined whether the target application program 200' has been launched. If the inquiry to decision step 940 is positive, then the "yes" branch is followed to step 945 in which the URL at the target application program 200' is received. In step 950, the current state data of the target application program 200' is saved. In step 960, the state index of the target application program 200' is then incremented.

If the inquiry to decision step 940 is negative, then the "no" branch is followed to step 955 in which the target application is launched. In step 965, the program identifier of the originating application program 200 contained within the forwarded URL or message 300 is saved. In step 970, the state index of the target application program 200' is incremented.

In decision step 975, it is determined whether the suite link is activated or alternatively, if a search result link has not been activated. If the inquiry to decision step 975 is negative, then the "no" branch is followed to step 980 in which a display within the target application program 200' based upon target data contained within the URL is generated. For example, if the search result list link 245B of FIG. 2B is activated, specifically, the "Foxes in U.S.A." link 245B, then display 200'C of FIG. 2C would be generated. Otherwise, if the inquiry to decision step 975 is positive, then the "yes" branch is followed to step 985 in which a display (not shown in the drawings) within the target application program 200' based upon previous state data is generated. If there is no previous state data for the target application program 200', such as the case when the target application program 200' is launched, then a default display (not shown) can be generated.

Exemplary Navigation Scenarios and Related State Data

The following navigation scenarios provide an example of how state data and state index information can be tracked by a respective application program. The exemplary nomenclature for state data and state index data is as follows: an asterisk, "*", will represent the current state of an application program; and a plus-sign, "+", will represent the application program that is currently active in controlling information on the display.

In one exemplary navigation scenario, application program A is launched. The state data for application A could be represented as follows:

App A(+)—[A1]* where "A1" can represent first state data. Next, an internal link is activated in which steps 510–540 of FIG. 5 will be executed. The state data for application program A could take the form of the following:

App A(+)—[A1][A2]*

Subsequently, a cross-link to a second application program (application B) is activated. Steps 610–660 of FIG. 6 would then be executed and Application program B would then be launched. The state data and state index data of both application programs could take the form of the following:

App A( )—[A1][A2][Reference to B]*

App B(+)—[Reference to A][B3]*

An internal link is then activated within the second application program, Application B, where the next state B4 is achieved. The state data and the state index data for both application programs could take the form of the following:

App A( )—[A1][A2][Reference to B]*

App B(+)—[Reference to A][B3][B4]*

Next, a cross-link to the first application program, application program A, is activated where a fifth state is entered. The state data and state index data for both application programs could take the form of the following:

App A(+)—[A1][A2][Reference to B] [Reference to B]A5*

App B( )—[Reference to A][B3][B4][Reference A]*

Subsequently, a back function is activated in order to return to the fourth state. Steps 710–795 of FIG. 7 would then be executed. The state data of both application programs could take the form of the following:

App A( )—[A1][A2][Reference B][Reference to B]*A5

App B(+)—[Reference to A][B3][B4]*[Reference to A]

In another exemplary navigation scenario, three separate application programs are inactive and have not been launched. The user decides to launch the first application program, Application A. The first state where the user has launched application program A could take the form of the following:

App A(+)—[A1]*

Next, a second state is entered by activating an internal link within the first application program, application program A. Steps 510–540 of FIG. 5 would then be executed. The state data and the state index data could take the form of the following:

App A(+)—[A1][A2]*

A third state is entered through a cross-link to a second application program, application program B. Steps 610–675 of FIG. 6 would then be executed. The state data and state index data of both application programs could take the form of the following:

App A( )—[A1][A2][Reference to B]*

App B(+)—[Reference to A][B3]*

The fourth state is entered into by an internal link within the second application program B. Steps 510–540 of FIG. 5 would then be executed. The state data and state index data for both application programs could take the form of the following:

App A( )—[A1][A2][Reference to B]*

App B(+)—[Reference to A][B3][B4]*

Subsequently, the fifth state is entered by activating a cross link to a third application program, application program C. Steps 610–675 of FIG. 6 would then be executed. The state data and state index data for the three application programs take the form of the following:

App A( )—[A1][A2][Reference to B]*

App B( )—[Reference to A][B3][B4][Reference to C]*

App C(+)—[Reference to B][C5]*

The sixth state is entered by an internal link within the third application program, application program C. Steps 510–540 of FIG. 5 would then be executed. The state data and state index data for the three applications programs could take the form of the following:

App A( )—[A1][A2][Reference to B]*

App B( )—[Reference A][B3][B4][Reference to C]*

App C(+)—[Reference B][C5][C6]*

The seventh state is then entered in the first application program, application program A where this state is achieved by a cross-link from application program C to application program A. Steps 610–675 of FIG. 6 would then be executed. The state data and state index data of the three application programs could take the form of the following:

App A(+)—[A1][A2][Reference to B][Reference to C]A7*

App B( )—[Reference to A][B3][B4][Reference to C]*

App C( )—[Reference to B][C5][C6][Reference to A]*

To return to the sixth state in the third application program, application program C, a back function is activated where Steps 710–795 of FIG. 7 would then be executed. The state data and state index data of the three application programs could take the form of the following:

App A( )—[A1][A2][Reference to B][Reference to C]*[A7]

App B( )—[Reference to A][B3][B4][Reference to C]*

App C(+)—[Reference to B] [C5][C6]*[Reference to A]

As noted previously, the form of the state data and state index data is not limited to the format discussed above and can be modified in various ways to those of ordinary skill in the art. The state index tracking mechanism can merely be a counter while the state data tracking mechanism could be an array.

While the present invention can be employed to track state data between graphics application programs and a text application programs, the invention is not limited to these embodiments and can be used in other environments where the tracking state data would be beneficial. For example, the present invention could be used with spreadsheets, databases, as well as with Internet or web browsers. Further, the present invention is not limited to the navigational tools discussed above. Other navigational tools could include a back or forward list (or both) as a drop down list menu that can be accessed from small arrows (not shown) disposed next to forward and back buttons. The appearance and behavior of such a user interface could be similar to that of the forward and back buttons of conventional web browsers.

With the present invention, navigation between separate programs is possible while providing a cohesive environment between the programs and a more friendlier user experience. In other words, the present invention provides a navigational tool that permits rapid and easy navigation through a sequence of content pieces both within and between separate programs or software products. Navigation between separate programs is substantially seamless to the user such that a user does not observe switching between programs other than through the data content being displayed to the user on a display device. The navigation tool of the present invention minimizes programming for existing software programs such that substantial retrofitting is unnecessary.

It should be understood that the forgoing relates only to illustrated embodiments to the present invention, and that numerous changes may be made therein without departing from the spirit and scope of the invention as defined by the following claims.

What is claimed is:

1. A method implemented by a computing device for navigating between electronic programs comprising the steps of:

providing a first state index comprising a first adjustable counter in an originating program, said first adjustable counter tracking a state of the originating program as the state changes among a plurality of different states of the originating program;

providing a second state index comprising a second adjustable counter in a target program;

in response to a navigation request, saving current state data of the originating program;

adjusting the first state index stored in the originating program to an appropriate value corresponding to the navigation request, wherein the appropriate value is indicated by the first adjustable counter;

generating a safe mode image for the originating program;
removing a storage medium containing display information for the originating program;
displaying the safe mode image while the storage medium is removed;
generating a message identifying one of a target program and the originating program;
forwarding the message to the target program;
adjusting the second state index stored in the target program to an appropriate value corresponding to the navigation request, wherein the appropriate value is indicated by the second adjustable counter; and
generating a display based upon one of saved state data of the target program and data contained within the message, whereby navigation between the originating program and target program is substantially seamless while programming for the navigation is substantially minimized.

2. The method of claim 1, wherein the step of saving current state data of the originating program further comprises saving at least one of text data, pop-up dialogs, graphics, and screen position of data.

3. The method of claim 1, wherein the message comprises a universal resource locator.

4. The method of claim 3, wherein the universal resource locator further comprises one of a protocol prefix, information identifying how the universal resource locator is created, and an originating program identifier.

5. The method of claim 1, further comprising the step of saving an identifier of the originating application within a storage medium accessible by the target application.

6. The method of claim 1, further comprising the steps of:
determining whether an unrecognized navigation request has been activated; and
if an unrecognized command has been activated, then ignoring the navigation request.

7. The method of claim 1, further comprising the steps of:
saving an identifier of the target application within a storage medium accessible by the originating application; and
determining whether the target application has been launched.

8. The method of claim 7, further comprising the steps of:
if the target application has not been launched, launching the target application such that the target application displays information corresponding to any data contained within the message; and
if the target application has been launched, saving current state data of the target application and incrementing the second state index of the target program.

9. The method of claim 1, further comprising the steps of:
determining whether a suite link has been activated;
if a suite link has been activated, then generating the display within the target application based upon previous state data of the target program; and
if a suite link has not been activated, then generating the display within the target application based upon data contained within the message.

10. The method of claim 1, further comprising the steps of:
determining whether a search result link has been activated;
if a search result link has not been activated, then generating the display within the target application based upon previous state data of the target program; and
if a search result link has been activated, then generating the display within the target application based upon data contained within the message.

11. The method of claim 1, further comprising the steps of:
determining whether a previous message identifying one of a target program and the originating program exists;
if a previous message does not exist, then ignoring the navigation request; and
if a previous message exists, then continuing processing of the navigation request.

12. The method of claim 11, further comprising the steps of:
determining whether the previous message contains target program information; and
if the previous message contains target program information, then continuing processing of the navigation request.

13. The method of claim 1, further comprising the steps of:
determining whether the message identifying the originating program corresponds with target program identifier information stored in a memory storage device accessible by the target program;
if the message does not correspond with the identifier information, then ignoring the navigation request; and
if the message corresponds with the identifier information, then continuing processing of the navigation request.

14. The method of claim 1, wherein the steps of adjusting the first state index of the originating program and the second state index of the target program further comprise the steps of:
incrementing the first state index of the originating program; and
incrementing the second state index of the target program.

15. The method of claim 1, wherein the steps of adjusting the first state index of the originating program and the second state index of the target program further comprise the steps of:
decrementing the first state index of the originating program; and
decrementing the second state index of the target program.

16. A computer readable medium having computer-executable instructions for performing the steps recited in claim 1.

17. A computer system with navigation capability between programs, comprising:
a processing unit;
a memory storage device;
a display device coupled to the processing unit for displaying data; and
a program module, stored in said memory storage device for providing instructions to said processing unit;
a first state index comprising a first adjustable counter provided in an originating program, said first adjustable counter tracking a state of the originating program as the state changes among a plurality of different states of the originating program;
a second state index comprising a second adjustable counter provided in a target program;
said processing unit responsive to said instructions of said program module, operable for:
in response to a navigation request, saving current state data of the originating program;

adjusting the first state index stored in the originating program to an appropriate value corresponding to the navigation request, wherein the appropriate value is indicated by the first adjustable counter;
generating a safe mode image for the originating program;
permitting removal of a storage medium containing display information for the originating program;
displaying the safe mode image while the storage medium is removed;
generating a message identifying one of the target program and the originating program;
forwarding the message to the target program;
adjusting the second state index stored in the target program to an appropriate value corresponding to the navigation request, wherein the appropriate value is indicated by the second adjustable counter; and
generating a display based upon one of saved state data of the target program and data contained within the message, whereby navigation between the originating program and target program is substantially seamless while programming for the navigation is substantially minimized.

18. A method for navigating between programs and within a single program comprising the steps of:
providing a first state index comprising a first adjustable counter in the single program, said first adjustable counter tracking a state of the originating program as the state changes among a plurality of different states of the originating program;
in response to a single program navigation request, saving current state data of an originating program;
adjusting a second state index stored in the originating program to an appropriate value corresponding to the navigation request, wherein the appropriate value is indicated by a second adjustable counter;
in response to an internal link navigation request, generating a first message containing target data;
generating a display based upon one of saved state data of the originating program and said target data contained within the message;
in response to a cross program application navigation request,
saving current state data of the originating program;
adjusting the second state index stored in the originating program to an appropriate value corresponding to the navigation request, wherein the appropriate value is indicated by the second adjustable counter;
generating a second message identifying one of a target program and the originating program;
forwarding the message to the target program;
adjusting a third state index stored in the target program to an appropriate value corresponding to the navigation request, wherein the appropriate value is indicated by a third adjustable counter; and
generating a display based upon one of saved state data of the target program and data contained within the message, whereby navigation within a single program and between the originating program and target program is substantially seamless while programming for the navigation is substantially minimized.

19. The method of claim 18, wherein the first and second messages comprise a universal resource locator.

20. The method of claim 19, wherein the universal resource locator further comprises one of a protocol prefix, information identifying how the universal resource locator is created, and an originating program identifier.

* * * * *